United States Patent
Enescu et al.

(10) Patent No.: US 11,483,721 B1
(45) Date of Patent: Oct. 25, 2022

(54) APPARATUS AND METHOD FOR BEAM MANAGEMENT

(71) Applicant: Nokia Technologies Oy, Espoo (FI)

(72) Inventors: Mihai Enescu, Espoo (FI);
Sami-Jukka Hakola, Kempele (FI);
Juha Pekka Karjalainen, Oulu (FI);
Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 50 days.

(21) Appl. No.: 17/317,225

(22) Filed: May 11, 2021

(51) Int. Cl.
*H04W 16/28* (2009.01)
*H04W 4/02* (2018.01)
*H04W 4/029* (2018.01)
*H04L 5/00* (2006.01)

(52) U.S. Cl.
CPC ........... *H04W 16/28* (2013.01); *H04L 5/0051* (2013.01); *H04W 4/027* (2013.01); *H04W 4/029* (2018.02)

(58) Field of Classification Search
CPC ...... H04W 16/28; H04W 4/029; H04W 4/027
See application file for complete search history.

(56) References Cited

U.S. PATENT DOCUMENTS

| | | | | |
|---|---|---|---|---|
| 9,496,973 | B2 * | 11/2016 | Yiu | H04B 15/00 |
| 10,516,468 | B2 * | 12/2019 | Yoon | H04L 5/0048 |
| 2014/0274069 | A1 * | 9/2014 | Scheim | H04W 36/00835 |
| | | | | 455/444 |
| 2016/0112864 | A1 * | 4/2016 | Harber | H04W 4/029 |
| | | | | 455/432.3 |
| 2018/0092094 | A1 * | 3/2018 | Ly | H04W 72/0413 |

FOREIGN PATENT DOCUMENTS

WO 2020/244748 A1 12/2020

OTHER PUBLICATIONS

"3rd Generation Partnership Project;Technical Specification Group Radio Access Network; NR;Physical layer procedures for control (Release 16)", 3GPP TS 38.213, V16.4.0, Dec. 2020, pp. 1-181.
"3rd Generation Partnership Project;Technical Specification Group Radio Access Network; NR;Physical layer procedures for data(Release 16)", 3GPP TS 38.214, V16.4.0, Dec. 2020, pp. 1-169.
"3rd Generation Partnership Project;Technical Specification Group Radio Access Network; NR;Radio Resource Control (RRC) protocol specification(Release 16)", 3GPP TS 38.331, V16.3.1, Jan. 2021, pp. 1-932.
"Enhancements on Predictable Mobility for Beam Management", 3GPP TSG RAN WG Meeting #90-e, RP-202675, Agenda : 9.12, ZTE, Dec. 7-11, 2020, 7 pages.

(Continued)

Primary Examiner — Joshua L Schwartz
(74) Attorney, Agent, or Firm — Nokia Technologies Oy

(57) ABSTRACT

One embodiment is directed to a method comprising estimating a velocity vector that is experienced by an apparatus; reporting to a network element, NE, the velocity vector; receiving from the NE at least one primary reference signal, RS, which will be experienced during a predicted trajectory, and at least one secondary RS that will potentially be experienced during the predicted trajectory; sending to the NE feedback based on the at least one primary RS and the at least one secondary RS; and sending an update of the velocity vector to the NE.

20 Claims, 9 Drawing Sheets

(56) References Cited

OTHER PUBLICATIONS

International Search Report and Written Opinion received for corresponding Patent Cooperation Treaty Application No. PCT/IB2022/053921, dated Jul. 21, 2022, 14 pages.
"Enhancements on predictable mobility for beam management", 3GPP TSG RAN WG Meeting #91-e, RP-210620, Agenda : 9.13, ZTE, Mar. 22-26, 2021, 7 pages.

* cited by examiner

APPARATUS AND METHOD FOR BEAM MANAGEMENT

TECHNICAL FIELD

The present application relates generally to an apparatus and a method for beam management.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Certain abbreviations that may be found in the description and/or in the Figures are herewith defined as follows:

| | |
|---|---|
| 3GPP | 3$^{rd}$ Generation Partnership Project |
| 5G | 5$^{th}$ Generation |
| AI | Artificial Intelligence |
| AP-CSI-RS | Aperiodic Channel State Information Reference Signal |
| AP-SRS | Aperiodic Sounding Reference Signal |
| BWP | Bandwidth Part |
| C-DRX | Connected Mode Discontinuous Reception |
| CC | Component Carrier |
| CE | Control Element |
| CORESET | Control Resource Set |
| CSI | Channel State Information |
| CSI-RS | Channel State Information Reference Signal |
| DCI | Downlink Control Information |
| DL | Downlink |
| DMRS | Demodulation Reference Signal |
| eMBB | enhanced Mobile Broadband |
| eNB | enhanced Node B |
| FR2 | Frequency Range 2 |
| gNB | 5G Node B |
| ID | Identifier |
| IoT | Internet of Things |
| L1-RSRP | Layer 1 Reference Signal Received Power |
| LTE | Long Term Evolution |
| M2M | Machine to Machine |
| MAC | Medium Access Control |
| MIMO | Multiple Input and Multiple Output |
| ML | Machine Learning |
| mMTC | massive Machine Type Communication |
| NE | Network Element |
| NG | Next Generation |
| NR | New Radio |
| P-CSI-RS | Periodic Channel State Information Reference Signal |
| P-SRS | Periodic Sounding Reference Signal |
| PDCCH | Physical Downlink Control Channel |
| PDSCH | Physical Downlink Shared Channel |
| PUCCH | Physical Uplink Control Channel |
| PUSCH | Physical Uplink Shared Channel |
| QCL | Quasi-Co-Location |
| RACH | Random Access Channel |
| RRC | Radio Resource Control |
| RS | Reference Signal |
| Rx | Reception |
| SP-CSI-RS | Semi-persistent Channel State Information Reference Signal |
| SP-SRS | Semi-persistent Sounding Reference Signal |
| SR | Scheduling Request |
| SRS | Sounding Reference Signal |
| SSB | Synchronization Signal Block |
| TCI | Transmission Coordination Indication |
| TRP | Transmission and Reception Point |
| TRS | Tracking Reference Signal |
| Tx | Transmission |
| UE | User Equipment |
| UL | Uplink |
| URLLC | Ultra Reliable Low Latency Communication |

LTE is a standard for wireless communication that seeks to provide improved speed and capacity for wireless communications by using new modulation/signal processing techniques. The standard was proposed by the 3GPP. Since its inception, LTE has seen extensive deployment in a wide variety of contexts involving the communication of data. In recent years, the exponential growth of smartphones and the traffic they generate have become a major challenge of the industry. 3GPP has been continuing to alleviate this challenge by enhancing LTE standards to further improve capacity and performance and introducing improvements for system robustness.

3GPP 5G or NG system, may support a number of use cases and features. These use cases are, but not limited to: eMBB and URLLC, as well as mMTC. 5G is mostly built on a NR, but a 5G (or NG) network can also build on LTE radio. NR is expected to deliver extreme broadband and ultra-robust, low latency connectivity and massive networking to support the IoT. With IoT and M2M communication becoming more widespread, there will be a growing need for designs that meet the needs of lower power, high data rate, and long battery life. It is noted that, in 5G, the nodes that can provide radio access functionality to a user equipment (i.e., similar to eNB in LTE) may be named gNB when built on NR radio and may be named NG-eNB when built on LTE radio.

The gNB in 5G systems may include one or more TRPs. Some gNB functionalities can be distributed across different TRPs, while others are centralized, leaving the flexibility for specific deployments to fulfil the requirements for specific use cases.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for support of beam management, is not intended to limit the scope of certain embodiments but is representative of selected example embodiments.

The features, structures, or characteristics of example embodiments described throughout this specification may be combined in any suitable manner in one or more example embodiments. For example, the usage of the phrases "example embodiment" "certain embodiments," "some embodiments," or other similar language, throughout this specification refers to the fact that a particular feature, structure, or characteristic described in connection with an embodiment may be included in at least one embodiment. Thus, appearances of the phrases "in an example embodiment", "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or", unless explicitly stated otherwise.

Figure 1:
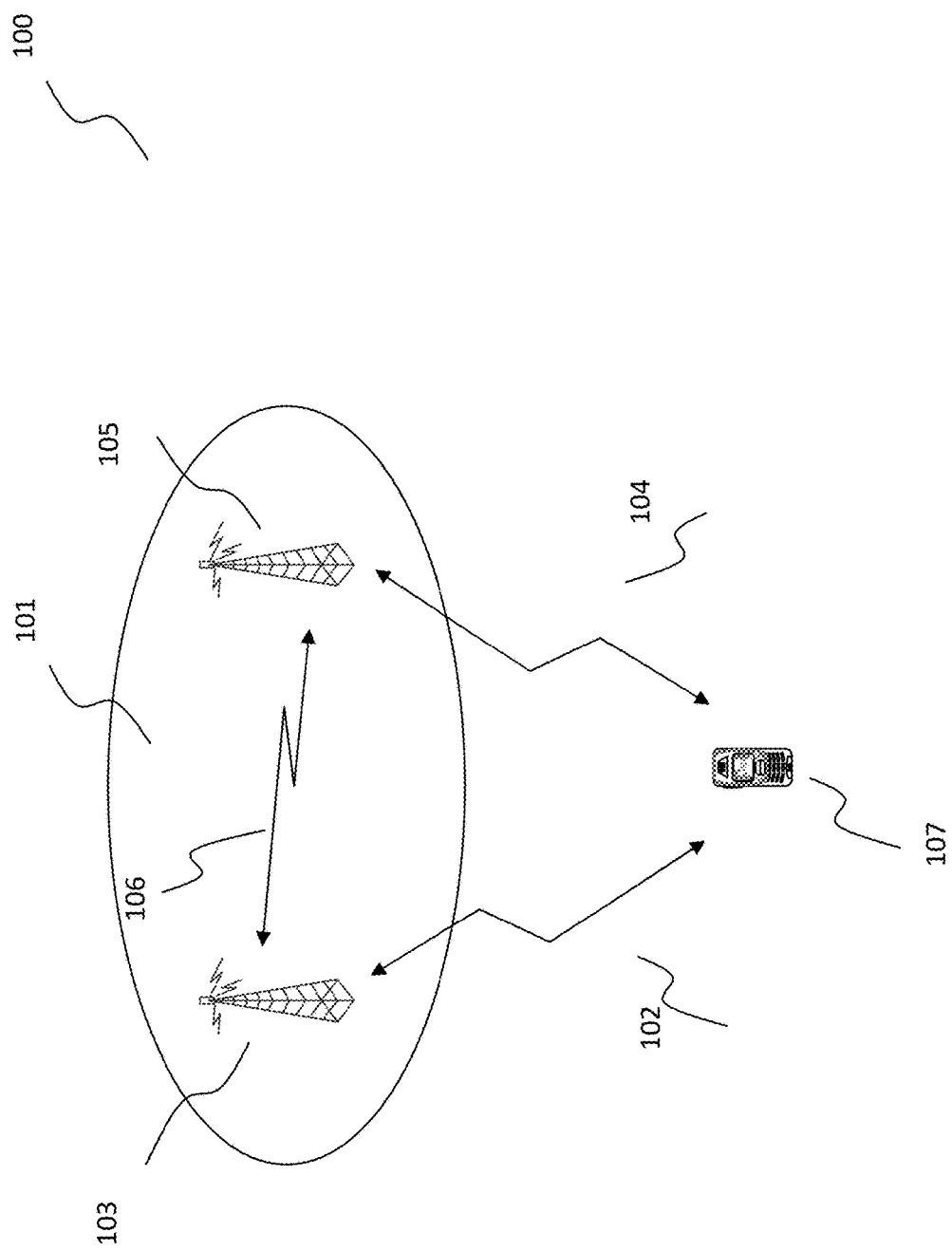
FIG. 1 illustrates an example communication system in which various example embodiments of the application implement.

FIG. 1 illustrates an example communication system 100 in which various embodiments of the application can be implemented. The example communication system 100 comprises a NE, 101, such as for example, a gNB or a NG-eNB connecting to a core network that is not shown for brevity. In the example scenario of FIG. 1, the NE 101 comprises two TRPs, 103 and 105, which serve a UE 107 via wireless links 102 and 104, respectively. The two TRPs communicate via a backhaul link 106. Although just one NE, two TPRs and one UE are shown in FIG. 1, it is only for the purpose of illustration and the example communication system 100 may comprise any number of NE(s), TRP(s) and UE(s).

Current NR releases have defined beam management procedures. These, however, are based on a framework where both the UE and gNB perform measurements on reference signals, report the computed quantities and execute specified procedures accordingly. Such a framework consumes an amount of resources at both ends and is based on a tight specified procedures.

Recent developments in algorithm operation as well as in the used hardware, are facilitating more the utilization of parameter prediction, which is also part of the so-called ML/AI algorithms. ML/AI are likely to be applied in many areas of a communication system, for example, in MIMO area such as beam management/predictable mobility, CSI acquisition, as well as in other physical domain procedures such as positioning, RS resource allocation.

Beam management comprises a set of procedures and functionalities that enable, maintain and refine the transmit and receive beam alignment between a transmitter and a receiver. A beam pair link established between the transmitter and the receiver comprises a pair of transmit beam and receive beam. The beam pair link between gNB and UE may be the same or different in DL and UL. In DL gNB provides UE with a QCL-TypeD RS based on which the UE can set its receive beam and a spatial relation information in UL, based on which the UE can further set its transmit beam.

The quasi collocation of two antenna ports means that the channel conditions for the symbols transmitted from those antenna ports are similar. Depending on the set of properties for the channel conditions 3GPP TS 38.214 defines the following QCL-types: QCL-TypeA, QCL-TypeB, QCL-TypeC, and QCL-TypeD. Specifically, for QCL-TypeD, the spatial Rx parameter is employed to define the channel conditions and is used to support beamforming.

Strictly speaking, QCL defines the relation between two reference signals at the UE receiver. In practice, the gNB can only guarantee that the properties of two reference signals are similar if the two reference signals are transmitted from the same TRP.

QCL-TypeD RS can be SSB, or CSI-RS. In order for a target signal to be received (e.g., DMRS of PDSCH, DMRS of PDCCH; CSI-RS), the UE is provided an information, such as for example, TCI state that comprises an indication of the QCL-TypeD RS. The UE applies the same Rx beam to receive target signal, as it uses to receive the QCL-TypeD RS (SSB or CSI-RS) indicated in the TCI state. In an example, the UE may be configured with up to 64 or 128 (if UE capability allows) TCI states.

In the UL the UE is provided a RS source. It can be an SSB, CSI-RS or SRS. In case of SSB or CSI-RS the UE uses the Rx beam used to receive the provided SSB or CSI-RS resource as spatial relation for the TX beam to transmit target signal (e.g. PUSCH, PUCCH, SRS). And in case of SRS the UE uses as TX beam to transmit target signal the same TX beam as is used to transmit the provided SRS resource.

Figure 2:
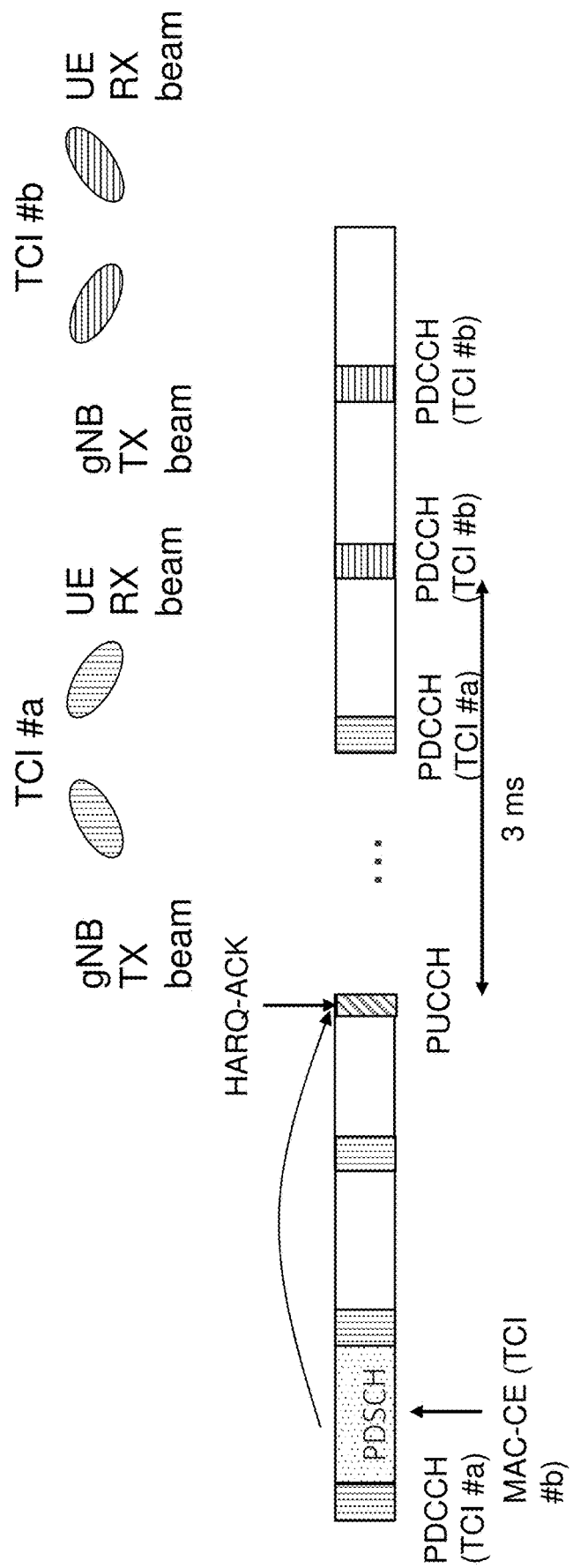
FIG. 2 illustrates an example of TCI state switching for PDCCH reception (TCI state is switched for the CORESET).

The main procedures and functionalities in beam management may be:

measurements and reporting of candidate reference signals that can act as a source to determine
transmit and receive beam pair in downlink and in uplink
    Typical assumption is that DL RSs are used for both DL and UL beam indication
      Tx/Rx beam correspondence is assumed at the UE
    UE is explicitly configured with SSB and/or CSI-RS resources for L1-RSRP
    measurements and reporting (CSI-RS framework)
      as an example, the UE may be configured with CSI-RS resource setting for
      up to 16 CSI-RS resource sets having up to 64 resources within each set. The
      total number of different CSI-RS resources over all resource sets is no more
      than 128
    UE reports the L1-RSRP of one or more best SSBs or CSI-RS s per report configuration
      The reporting comprises a resource index and L1-RSRP value
  beam indication/beam switching
    In downlink the UE is provided a TCI state for the target signal, based on which the
    UE can receive the target signal. The TCI state is provided either:
      with RRC configuration for P-CSI-RS (including TRS)
      with MAC-CE for PDCCH (one active TCI state per CORESET), SP-CSI- RS, AP-CSI-RS, PDSCH (when follows PDCCH)
with DCI for PDSCH (when explicit indication in use), and AP-CSI-RS
(triggering of certain CSI-RS resource set(s)
In uplink the UE is provided a spatial relation for the target signal based on which the
UE forms the transmit beam. The provisioning of the spatial relation is either:
  RRC based (for P-SRS)
  MAC-CE based (for SP-SRS, AP-SRS, PUCCH, PUSCH (when follows PUCCH
  with resource ID = 0)), or
  DCI based (indirectly for PUSCH (DCI indicates reference SRS(s) so that UE shall
  transmit PUSCH with the same beam(s) as it transmitted given SRSs)
Also some default beam assumptions have been defined in Rel15/Rel16
  PDSCH:
    If scheduling offset < timeDurationForQCL: TCI state is the one of
    the lowest CORESET ID in the latest slot monitored by UE
    If scheduling offset >= timeDurationForQCL: TCI state is the one of
    the CORESET of the scheduling PDCCH if TCI state is not provided
    in the DCI, or PDSCH reception is based on the TCI state provided in
    DCI
  AP-CSI-RS:
    If scheduling offset < beamSwitchTiming: the UE either aligns the TCI
    state with an overlapping other signal TCI state, or applies TCI state of
    the lowest CORESET ID in the latest slot monitored by UE
  PUCCH/SRS
    If spatial relation is not configured, in FR2 determine spatial relation as
    follows:
      a. in case when CORESET(s) are configured on the CC, the TCI
         state/QCL assumption follows the one of the CORESET with the
         lowest ID, or
      b. in case when any CORESETs are not configured on the CC, the
         activated TCI state with the lowest ID is applicable to PDSCH in
         the active DL-BWP of the CC
  PUSCH scheduled by DCI format 0_0
    when there are no PUCCH resources configured on the active UL BWP
    CC in FR2 and in RRC-connected mode:
      a. The default spatial relation is the TCI state/QCL assumption of
         the CORESET with the lowest ID
In multi-TRP scenario, TCI codepoint may comprise two TCI states and as default
beam case the UE assumes the TCI states of the TCI codepoint with the lowest ID
(e.g. for PDSCH)
MAC-CE based beam switching, i.e. activation of TCI state in downlink and activation
of spatial relation RS in uplink follows the following principles: UE applies the new
assumption 3 ms after the UE has sent the HARQ-ACK for the PDSCH carrying the
MAC-CE. An example high level illustration for the TCI state switching for the
CORESET, i.e. for PDCCH reception, is given in FIG. 2.

In high speed scenarios, several factors influence the system capacity: The beam dwelling time is very short, which means that due to the high speed of the UE, the time the UE experiences a single beam gets shorter as the UE speed increases and the beamwidth gets narrower; With a shorter beam (CSI-RS) dwelling time, the CSI-RS overhead increases considerably and hence decreases the system capacity. Other reporting channels get congested as frequent CSI-RS transmission implies also frequent reporting.

In high mobility/speed situations, it may become impractical to perform traditional signaling, and prediction-based methods may be required to allow for practical implementations. Hence, there is a demand to enable facilitating ML/AI algorithms and functionalities in beam management in 3GPP NR system and beyond. The ML/AI solutions may require less signaling than traditional methods while achieving same or even better performance.

In an example embodiment, a UE, such as for example, the UE 107 of FIG. 1, may estimate and report to a gNB, such as for example, the NE 101 of FIG. 1, a velocity vector it is experiencing. The velocity vector may comprise at least one of speed, velocity or directionality of the movement. Depending on the actual velocity, the vector can be estimated/reported less often (for low speeds) or more often (for higher speeds).

In an example embodiment, based on the velocity vector the gNB may predict for the UE a trajectory, and a mapping of the beams/RSs, which the UE may experience along the trajectory.

In an example embodiment, the gNB may inform the UE of at least one primary RS that will be experienced during its trajectory. A timestamp may indicate the time at which the UE will experience a particular RS. Alternatively or additionally, the gNB may know and inform the UE of the time at which a transition from a RS to another RS is expected.

In an example embodiment, the gNB may inform the UE of at least one secondary RS that will potentially be experienced during its trajectory. The at least one secondary RS may be grouped into one or more sets of secondary RSs, and may be also associated with a timestamp.

In an example embodiment, the UE may send an indication to the gNB indicating that no primary RS is detected. Alternatively or additionally, the UE may send an indication to the gNB indicating that a secondary RS is detected. Alternatively or additionally, the UE may send an indication to the gNB indicating that the UE is on track of the predicted trajectory, i.e., the past N utilized RS(s) are part of the set of primary RSs. In another example embodiment, a lack of indication means that the UE is on track of the predicted trajectory.

In an example embodiment, the UE may form a RS index pair between a previous RS index and a current RS index (previous_RS_index, current_RS_index), and may send the RS index pair to the gNB. If the index pair is (primary_RS_index i, primary_RS_index j), the RS utilization is according to the prediction. If the index pair is (primary_RS_index i, secondary_RS_index j), the RS utilization is deviating from the prediction and the UE may inform again the gNB of the velocity vector as the gNB prediction needs to be reconsidered.

In an example embodiment, the UE may link to the RS timestamp a reliability index which is fed back to the gNB.

Figure 3:
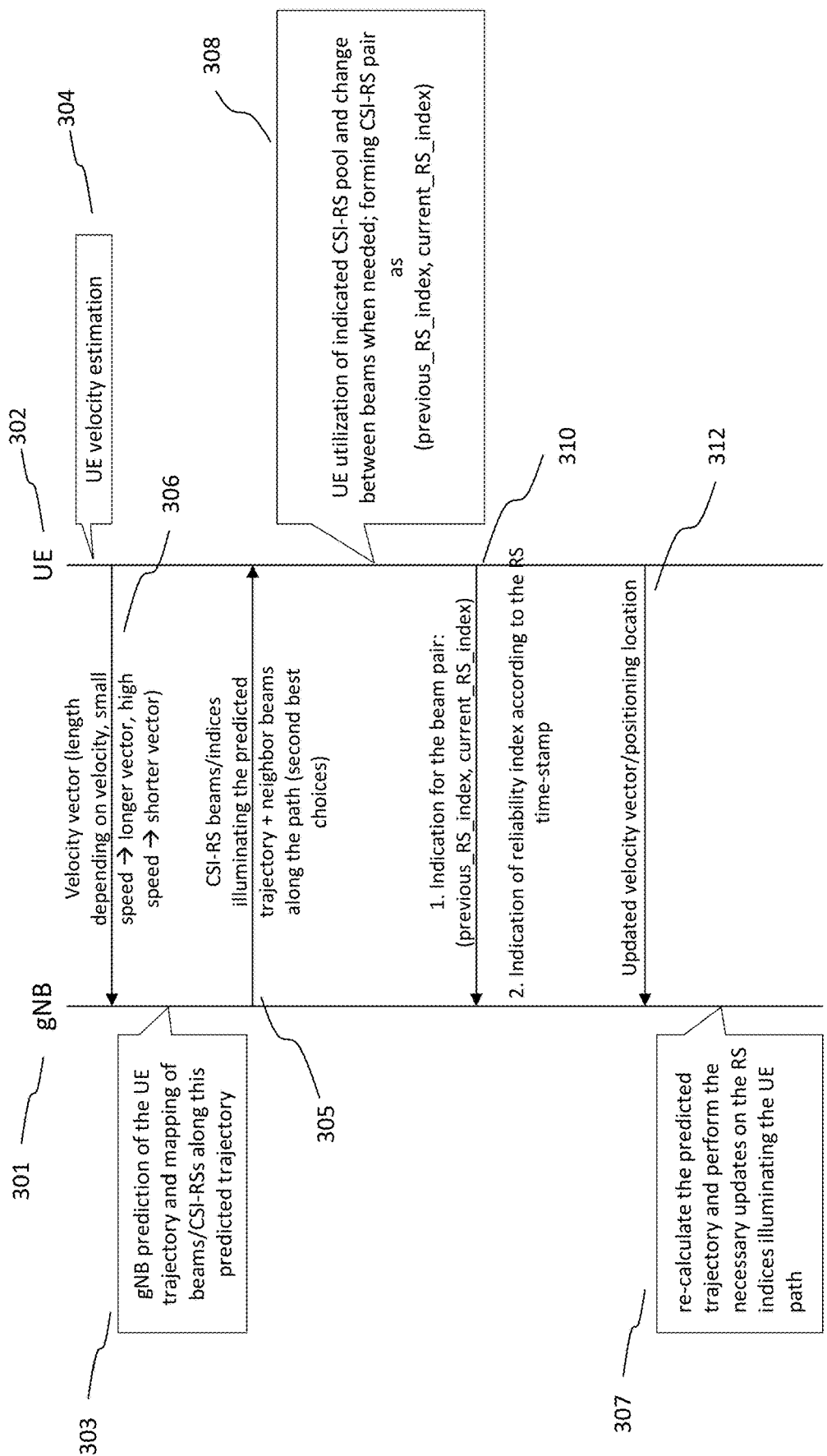
FIG. 3 describes gNB-UE procedures according to an example embodiment.

A flow of procedures for the gNB 301 and UE 302 according to an example embodiment is presented in FIG. 3. The UE 302, such as for example, the UE 107 of FIG. 1, is assumed to be equipped with various sensors and radio receivers which provide accurate measurements of speed and position coordinates. These, or a subset of these, may be sent to the gNB 301, such as for example, the NE 101 of FIG. 1. Depending on the experienced speed, the UE may send more or less detail on such information. It is understood that in lower speed conditions, prediction of UE trajectory can be made for a longer period of time while in higher speed conditions more information may need to be sent for updating the predicted trajectory.

In the example embodiment of FIG. 3, the UE 302 may obtain velocity estimation at 304 and send the velocity vector to the gNB 301 at 306.

In an example embodiment, once the UE measurements are available at the gNB 301, it proceeds at 303 on predicting the UE trajectory and mapping this to the beams, formed for example by SSB, CSI-RS, DM-RS or other reference signals, which are going to illuminate the UE trajectory. One may characterize these reference signals into at least one primary reference signal, which illuminates exactly the predicted path, and at least one secondary reference signal, which is in the vicinity of the predicted path. Such secondary reference signals are needed in order to allow potential deviation from the predicted trajectory in case of unexpected UE events, such as for example, UE rotation or sudden unexpected deviation of movement from the predicted trajectory. At 305, the information regarding the at least one primary reference signal and the at least one secondary reference signal may be sent to the UE. In an example embodiment, the signaling of the set(s) of reference signals may happen via higher layer, such as for example, the RRC layer. In another example embodiment, the relevant signaling may be carried by MAC CE or DCI. Along the reference signals indices, the gNB may provide a timestamp indicating when a reference signal might be experienced on the predicted trajectory. The timestamps of the set of reference signals may form a time map of when such reference signals might be needed on the predicted trajectory. In this way the UE may know more precisely when to measure a particular reference signal and also when to expect to measure a new reference signal, hence making the reference signals change more predictable.

The UE 302 may proceed with the utilization of the received information and perform measurements at step 308. If the association between the reference signals and the trajectory/timestamp is available, the UE may use it. It is also expected that the association between the reference signals and the predicted trajectory/timestamp may allow the UE better power saving opportunities as the reference signals measurements, or the up-time of the panels/RF modules, may be optimized according to the reference signals availability.

In an example embodiment, when performing the measurements such as L1-RSRP/CSI, on the indicated reference signals, the UE may at 308 also form a feedback including the (previous_RS_index, current_RS_index) and send the feedback to the gNB at 310. In an example embodiment, an indication of reliability index corresponding to the timestamp may also be sent at 310. When the current_RS_index is an index of a RS from the at least one primary RS, then this implies the trajectory prediction is correct. If the current_RS_index is an index of a RS from the at least one secondary RS, this implies that the trajectory prediction needs to be updated, or that the UE has experienced rotation or other event which led to a change in beam reception. This may trigger the signaling of an updated velocity vector, positioning location or other information at 312, which can help the gNB re-calculate the predicted trajectory and perform the necessary updates on the RS indices illuminating the UE path at 307. Along such an update, the UE might inform the gNB if it has experienced sudden rotation or other movement which could have been the trigger of utilizing the secondary beam.

In an example embodiment, the gNB's/network's ML/AI algorithms may take into account the received feedback or the updated velocity vector when re-calculating the predicted trajectory.

In an example embodiment, when gNB estimates the UE trajectory, the network may provide UE with a periodic SRS/SR/RACH/uplink signal configuration to obtain information on the predicted path. The periodicity or the enabling of UL signal transmission may be triggered by a state transition e.g. when UE enters RRC INACTIVE/IDLE, or UE enters C-DRX.

In an example embodiment, the UE may be equipped with multiple panels. When the UE has available the predicted trajectory, either signaled from the gNB or based on its own prediction, and when the UE has the indicated RSs along the timestamps of the trajectory, UE may assign beam robustness information, e.g., a reliability index, on the timestamp of the indicated RS index. Every RS may get assigned a beam reliability index indicating the reliability of a Rx beam used for the reception of the transmitted RS. Assigning a robustness information may allow the UE to handle better the power consumption of panels, by turning them on or off in advance; allow gNB to have a more advanced link adaptation; and indicate gNB the degree of available fallback.

Figure 4:
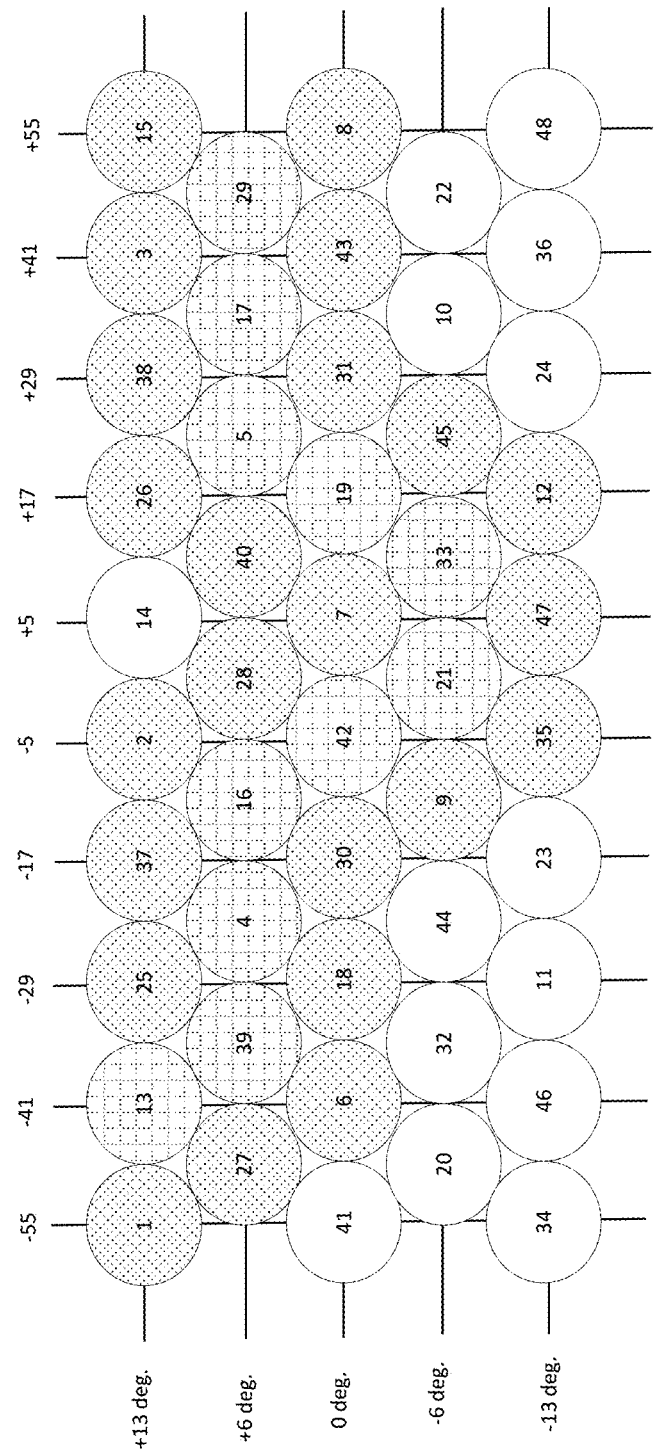
FIG. 4 describes an exemplary CSI-RS beam arrangement according to an example embodiment.

FIG. 4 shows an exemplary CSI-RS beam arrangement according to an example embodiment. In this example, beams denoted by grid circles are the CSI-RS beam on the predicted path, hence the primary beams, while beams denoted by dotted circles are the secondary beams which are indicated along the primary beams. These serve as backup to the UE. For example, when the UE prepares to use primary beam 4, it also checks the signal quality of secondary beams 37 or 30, and in this example the UE may already have the information of the signal quality of beams 25 or 18.

In the example of FIG. 4, the UE feeds back beam pair formed from the (prevous_RS_index, current_RS_index). If these two beams are both parts of the set of primary beams, it means the prediction is correct and no new velocity vector is fed back. If a secondary beam is indicated as new beam, it is an indication that prediction was not correct and hence a new velocity vector may be fed to the gNB for new prediction.

Figure 5:
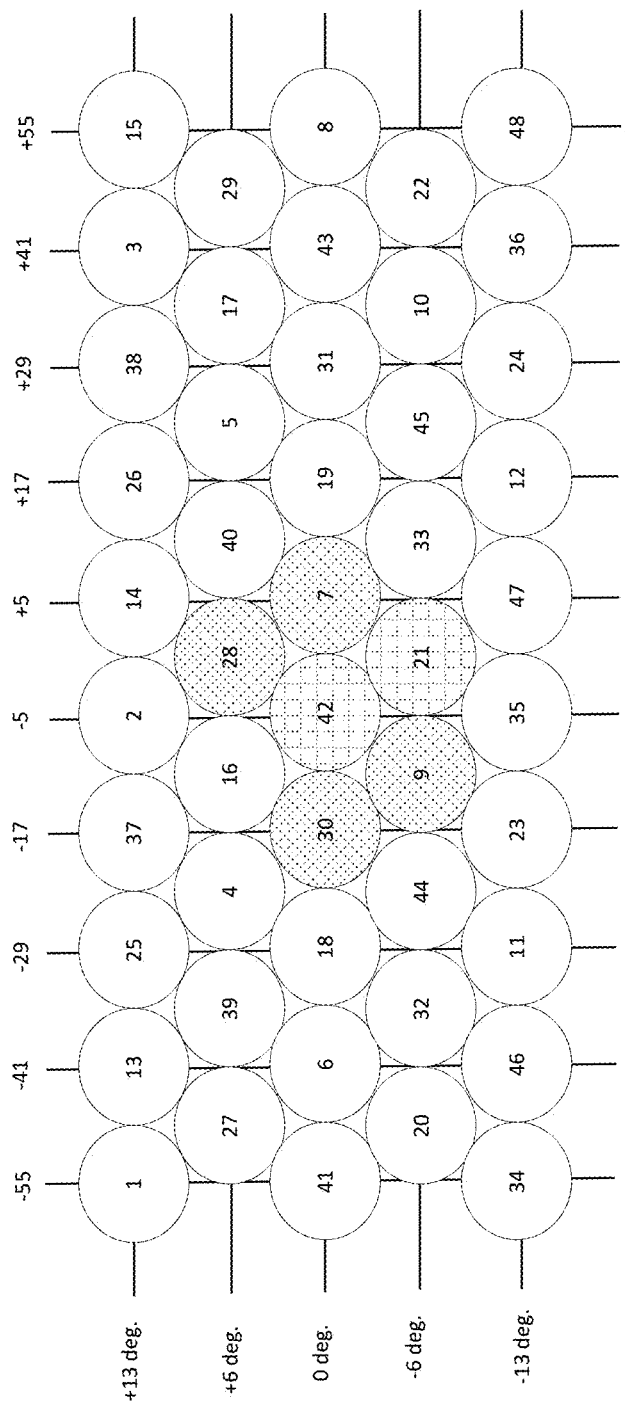
FIG. 5 describes an exemplary CSI-RS beam arrangement when only active and future primary and secondary beams are ON according to an example embodiment.

In an example embodiment, not all the beams may be turned on at a particular time as the gNB knows the position of the UE in time and hence the necessary beams (primary and secondary) which are needed for its operation. This is depicted in FIG. 5. If the UE comes back and forth on the same path, the corresponding beams (e.g., CSI-RS indices) may be reactivated depending on the position.

Figure 6:
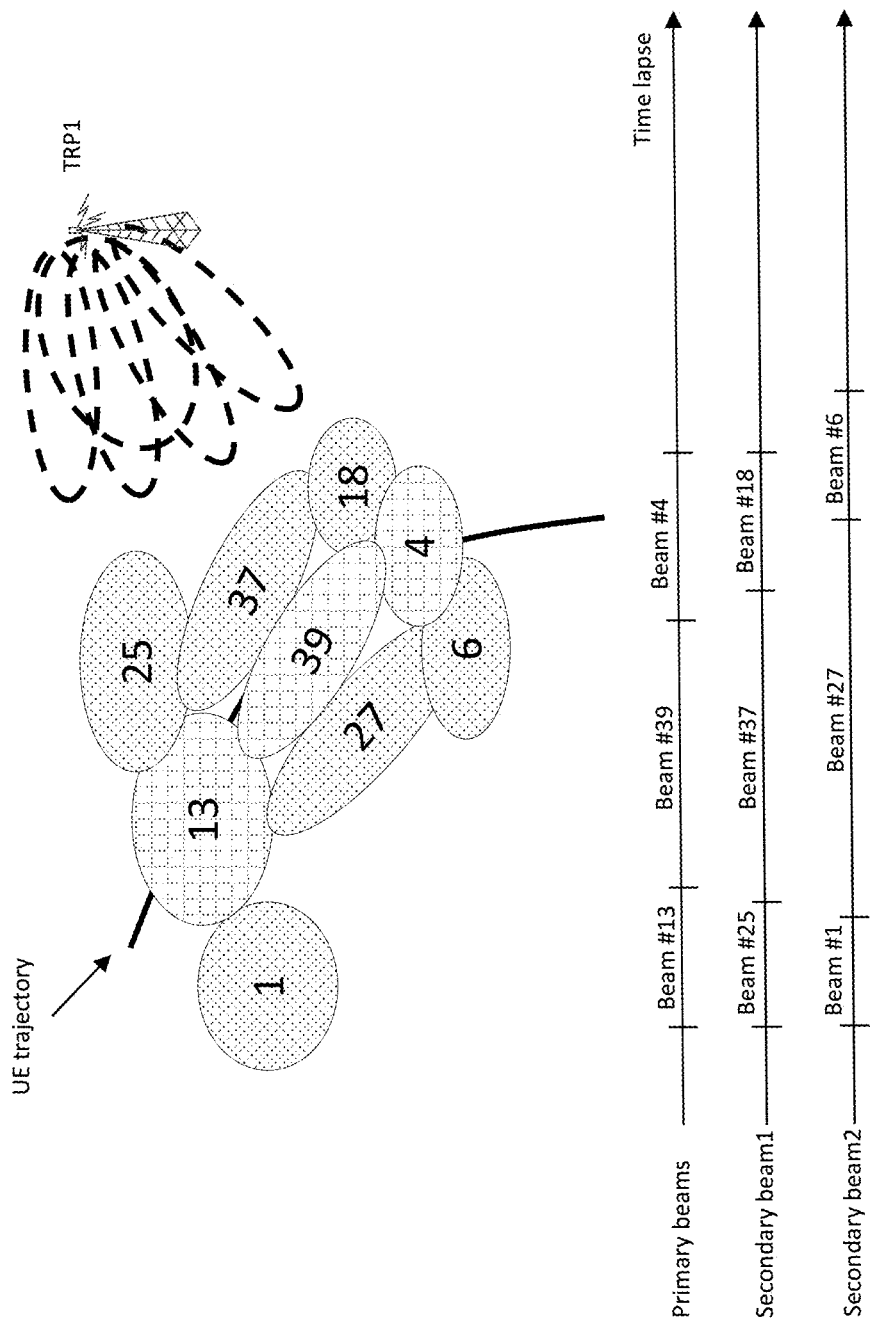
FIG. 6 describes an exemplary CSI-RS beam time lapses for primary and two sets of secondary beams according to an example embodiment.

FIG. 6 describes an example of time lapse association with beam/RS indices, for primary and secondary RSs according to an example embodiment. It is noted that each of the beams may have its own time lapse, for example the durations of the beams which are assigned for primary beam, may be different from the duration of the beams which are secondary.

Figure 7:
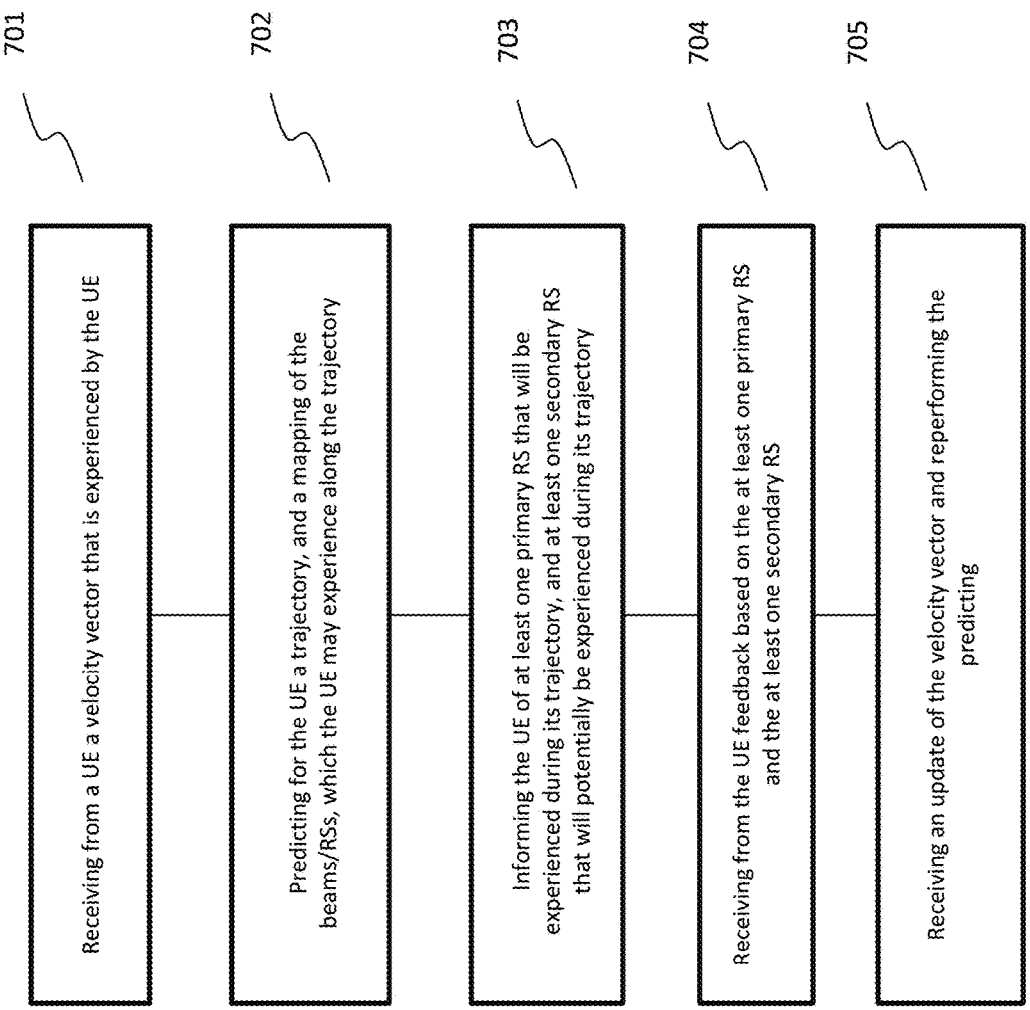
FIG. 7 provides a flowchart to illustrate some NE procedures according to an example embodiment.

FIG. 7 describes a block diagram for some operation of a NE according to an example embodiment. In FIG. 7, a NE, such as for example, NE 101 of FIG. 1 or NE 301 of FIG. 3, may receive at 701 from a UE, such as for example, UE 107 or UE 302, a velocity vector that is experienced by the UE. In an example embodiment, the velocity vector may comprise at least one of speed, velocity and/or directionality of the movement. Depending on the actual velocity, the vector can be valid for a longer period (for low speeds) or for a shorter period (for higher speeds). At 702, the NE may predict for the UE a trajectory, and a mapping of the beams/RSs, which the UE may experience along the trajectory. The NE may inform the UE of at least one primary RS that will be experienced during its trajectory, and at least one secondary RS that will potentially be experienced during its trajectory at 703. In an example embodiment, a timestamp may indicate the time at which the UE will experience a particular primary RS. Alternatively or additionally, the gNB may know and inform the UE of the time at which a transition from a primary RS to another primary RS is expected.

At 704, the NE may receive from the UE feedback based on the at least one primary RS and the at least one secondary RS. In an example embodiment, the feedback may comprise an indication indicating that no primary RS is detected by the UE. Alternatively or additionally, the feedback may comprise an indication indicating that a secondary RS is detected. Alternatively or additionally, the feedback may comprise an indication indicating that the UE is on track of the predicted trajectory. In other example embodiment, the feedback may comprise a RS index pair between a previous RS index and a current RS index (previous_RS_index, current_RS_index). In an example embodiment, the feedback may include a reliability index associated to a RS timestamp. In another embodiment, a lack of indication means that the UE is on track of the predicted trajectory. At 705, the NE may receive an update of the velocity vector, and at least based on the received update, may reperform the predicting.

Figure 8:
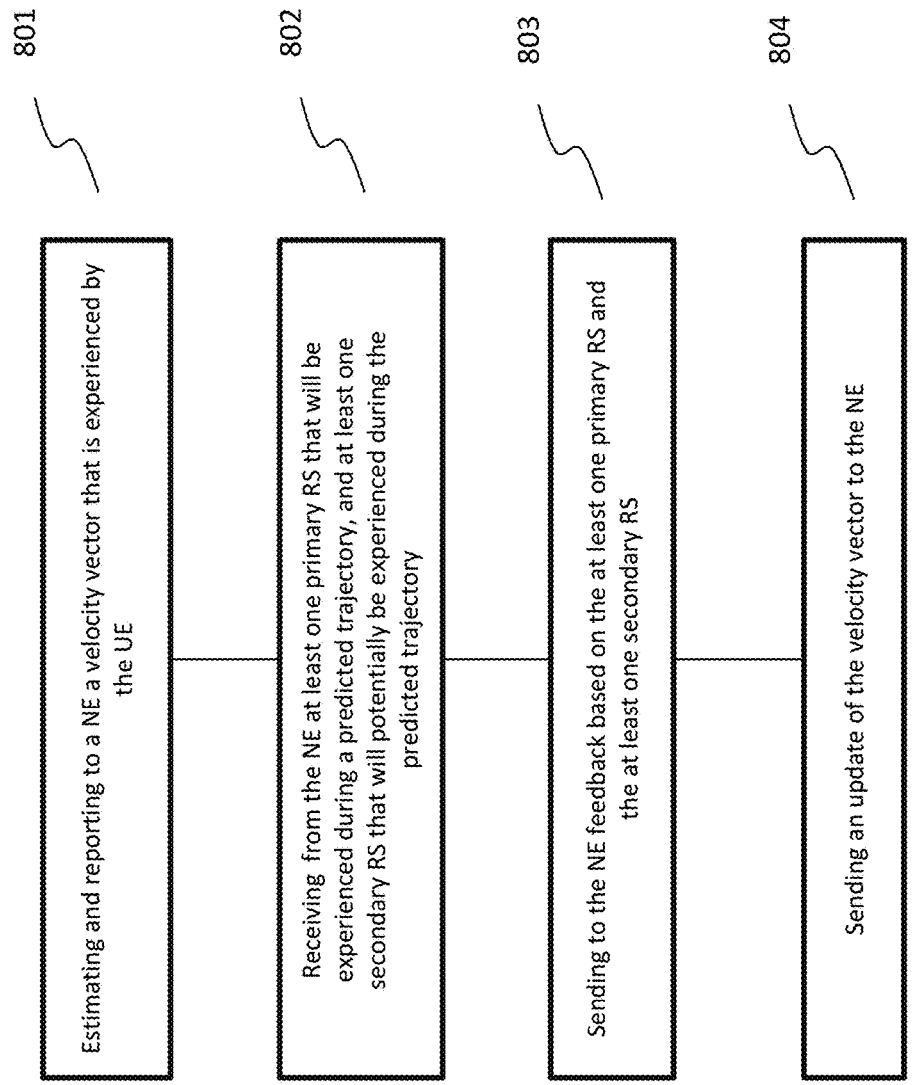
FIG. 8 provides a flowchart to illustrate some UE procedures according to an example embodiment.

FIG. 8 describes a block diagram for some operation of a UE according to an example embodiment. In FIG. 8, at 801, a UE, such as for example, UE 107 of FIG. 1 or UE 302 of FIG. 3, may estimate and report to a NE, such as for example, NE 101 or NE 301, a velocity vector that is experienced by the UE. In an example embodiment, the velocity vector may comprise at least one of speed, velocity or directionality of the movement. Depending on the actual velocity, the vector can be estimated/reported less often (for low speeds) or more often (for higher speeds). The UE may receive from the NE at least one primary RS that will be experienced during a predicted trajectory, and at least one secondary RS that will potentially be experienced during the predicted trajectory at 802. In an example embodiment, a timestamp may indicate the time at which the UE will experience a particular primary RS. Alternatively or additionally, the UE may receive from the NE information of the time at which a transition from a primary RS to another primary RS is expected.

At 804, the UE may send to the NE feedback based on the at least one primary RS and the at least one secondary RS. In an example embodiment, the feedback may comprise an indication indicating that no primary RS is detected by the UE. Alternatively or additionally, the feedback may comprise an indication indicating that a secondary RS is detected. Alternatively or additionally, the feedback may comprise an indication indicating that the UE is on track of the predicted trajectory. In other example embodiment, the feedback may comprise a RS index pair between a previous RS index and a current RS index (previous_RS_index, current_RS_index). In an example embodiment, the feedback may include a reliability index associated to a RS timestamp. In another embodiment, a lack of indication means that the UE is on track of the predicted trajectory. At 804, the UE may send an update of the velocity vector to the NE, which enables the NE to reperform the predicting at least based on the update.

Figure 9:
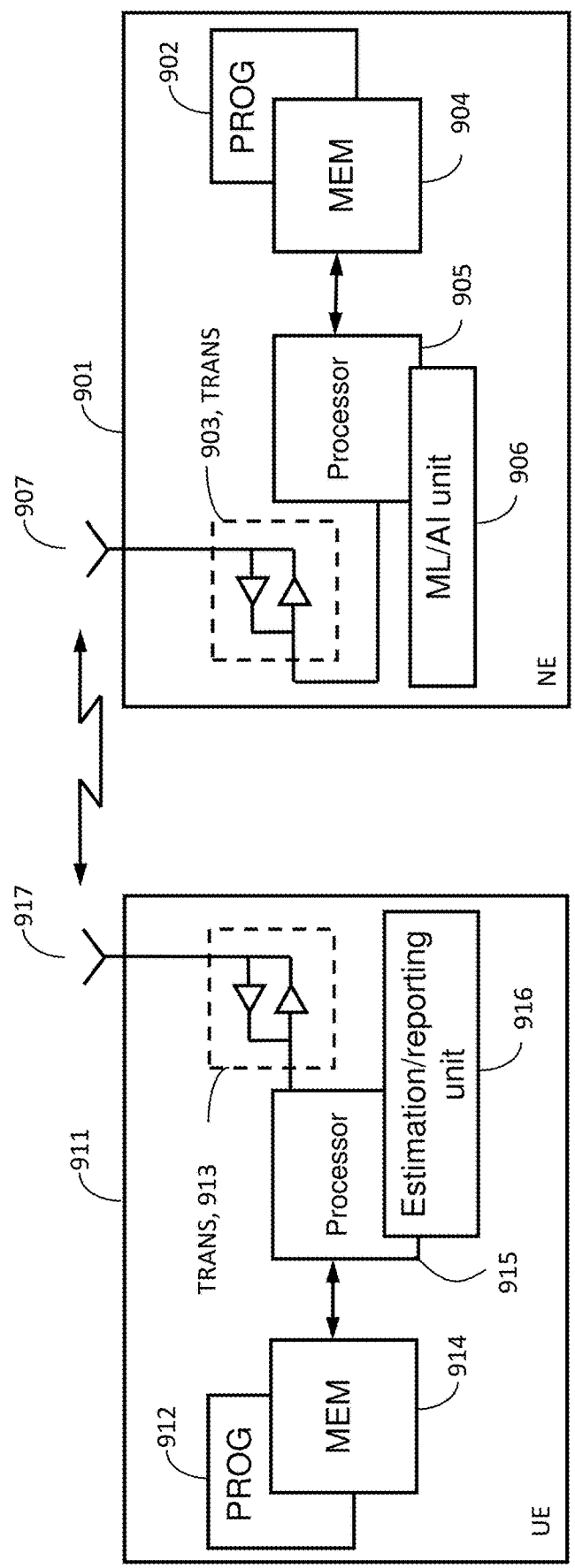
FIG. 9 illustrates a simplified block diagram of various example apparatuses that are suitable for use in practicing various example embodiments of this application.

Reference is made to FIG. 9 for illustrating a simplified block diagram of various example apparatuses that are suitable for use in practicing various example embodiments of this application. In FIG. 9, a network element, NE, 901, such as for example, the NE 101 of FIG. 1 or NE 301 of FIG. 3, is adapted for communication with a UE 911, such as for example, the UE 107 of FIG. 1 or UE 302 of FIG. 3. The UE 911 includes at least one processor 915, at least one memory, MEM, 914 coupled to the at least one processor 915, and a suitable transceiver, TRANS, 913 (having a transmitter, TX, and a receiver, RX) coupled to the at least one processor 915. The at least one MEM 914 stores a program, PROG, 912. The TRANS 913 may include or be coupled to one or more antennas 917 and is for bidirectional wireless communications with the NE 901.

The NE 901 includes at least one processor 905, at least one MEM 904 coupled to the at least one processor 905, and a suitable TRANS 903 (having a TX and a RX) coupled to the at least one processor 905. The at least one MEM 904 stores a PROG 902. The TRANS 903 may include or be coupled to one or more antennas 907 and is for bidirectional wireless communications with the UE 911. The NE 901 may be coupled to one or more cellular networks or systems, which is not shown in this figure.

As shown in FIG. 9, the NE 901 may further include a ML/AI unit 906. The unit 906, together with the at least one processor 905 and the PROG 902, may be utilized by the NE 901 in conjunction with various example embodiments of the application, as described herein.

As shown in FIG. 9, the UE 911 may further include an estimation/reporting unit 916. The unit 916, together with the at least one processor 915 and the PROG 912, may be utilized by the UE 911 in conjunction with various example embodiments of the application, as described herein.

In general, the various example embodiments of the apparatus 901 can include a node, host, or server in a communications network or serving such a network. For example, apparatus 901 may be a network node, satellite, base station, a Node B, an evolved Node B, eNB, 5G Node B or access point, next generation Node B, NG-NB or gNB, or a WLAN access point, associated with a radio access network, such as a LTE, 5G or NR network.

It should be understood that, in some example embodiments, apparatus 901 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 901 represents a gNB, it may be configured in a central unit, CU, and distributed unit, DU, architecture that divides the gNB functionality. In such an architecture, the CU may be a logical node that includes gNB functions such as transfer of user data, mobility control, radio access network sharing, positioning, or session management, etc. The CU may control the operation of DU(s) over a front-haul interface. The DU may be a logical node that includes a subset of the gNB functions, depending on the functional split option. In another example, a gNB may comprise multiple TRPs, It should be noted that one of ordinary skill in the art would understand that apparatus 901 may include components or features not shown in FIG. 9.

In general, the various example embodiments of the apparatus 911 can include, but are not limited to, cellular phones, personal digital assistants having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In an embodiment, apparatus 911 may be a node or element in a communications network or associated with such a network, such as a UE, mobile equipment, ME, mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display, a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 911 may be implemented in, for instance, a wireless handheld device, a wireless plug-in accessory, or the like. It should be noted that one of ordinary skill in the art would understand that apparatus 901 may include components or features not shown in FIG. 9.

The example embodiments of this disclosure may be implemented by computer software or computer program code executable by one or more of the processors 905, 915 of the NE 901 and the UE 911, or by hardware, or by a combination of software and hardware.

At least one of the PROGs 902 and 912 is assumed to include program instructions that, when executed by the associated processor, enable the electronic apparatus to operate in accordance with the example embodiments of this disclosure, as discussed herein.

The TRANS 903 and 913 may include, for example, a plurality of radio interfaces that may be coupled to the antenna(s) 907 and 917, respectively. The radio interfaces may correspond to a plurality of radio access technologies including one or more of GSM, WCDMA, NB-IoT, LTE, 5G, WLAN, Bluetooth, BT-LE, NFC, radio frequency identifier, ultrawideband, MulteFire, and the like. The radio interface may include components, such as filters, converters (for example, digital-to-analog converters and the like), mappers, a Fast Fourier Transform module, and the like, to generate symbols for a transmission and to receive symbols.

As such, TRANS 903 and 913 may be configured to modulate information on to a carrier waveform for transmission by the antenna(s) and demodulate information received via the antenna(s) for further processing by other elements of apparatus 901 and 911, respectively. In other embodiments, TRANS 903 and 913 may be capable of transmitting and receiving signals or data directly. Additionally or alternatively, in some embodiments, apparatus 901 and/or 911 may include an input and/or output device.

The MEMs 904 and 914 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. For example, memory 904 and 914 can be comprised of any combination of random access memory, read only memory, static storage such as a magnetic or optical disk, hard disk drive, or any other type of non-transitory machine or computer readable media. The instructions stored in memory 904 or 914 may include program instructions or computer program code that, when executed by processor 905 or 915, enable the apparatus 901 or 911 to perform tasks as described herein.

In an embodiment, apparatus 901 or 911 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 905/915 or apparatus 901/911.

The processors 905 and 915 may be of any type suitable to the local technical environment, and may include one or more of general purpose computers, special purpose computers, microprocessors, digital signal processors, field-programmable gate arrays, application-specific integrated circuits, and processors based on multi-core processor architecture, as non-limiting examples. While a single processor 905 and 915 is shown in NE and UE of FIG. 9, respectively, multiple processors may be utilized according to other embodiments. For example, it should be understood that, in certain embodiments, apparatus 901 or 911 may include two or more processors that may form a multiprocessor system (e.g., in this case processor 905 or 915 may represent a multiprocessor) that may support multiprocessing. In certain embodiments, the multiprocessor system may be tightly coupled or loosely coupled (e.g., to form a computer cluster).

Without in any way limiting the scope, interpretation, or application of the claims appearing below, a technical effect of one or more of the example embodiments disclosed herein may be resulting in reduced/optimized UE power consumption, reduced timing offsets needed to switch UE panels, reduced gNB interference and power consumption due to the reduced transmission of downlink beams.

The following are additional examples.

Example 1. A method, comprising: estimating a velocity vector that is experienced by a user equipment; reporting to a network element, NE, the velocity vector; receiving from the NE at least one primary reference signal, RS, which will be experienced during a predicted trajectory, and at least one secondary RS that will potentially be experienced during the predicted trajectory; sending to the NE feedback based on the at least one primary RS and the at least one secondary RS; and sending an update of the velocity vector to the NE.

Example 2. The method of example 1, wherein the velocity vector comprises information of at least one of speed, velocity, or directionality of movement.

Example 3. The method of example 1, wherein the at least one secondary RS is grouped into one or more sets of secondary RS.

Example 4. The method of example 1, wherein a timestamp indicates the time at which the UE will experience a particular primary or secondary RS.

Example 5. The method of example 4, further comprises sending to the NE a reliability index associated with a RS timestamp.

Example 6. The method of example 1, further comprises receiving information regarding a time at which a transition from a primary RS to another primary RS is expected.

Example 7. The method of example 1, wherein the feedback comprises at least one of the following: an indication indicating that no primary RS is detected; an indication indicating that a secondary RS is detected; an indication indicating that the UE is on track of the predicted trajectory; or a RS index pair between a previous RS index and a current RS index.

Example 8. The method of example 7, wherein sending the update of the velocity vector is in response to the RS index pair being (primary_RS_index i, secondary_RS_index j).

Example 9. A method, comprising: receiving from a user equipment, UE, a velocity vector that is experienced by the UE; predicting for the UE a trajectory, and a mapping of the beams/RSs, which the UE may experience along the trajectory; sending to the UE at least one primary reference signal, RS, which will be experienced by the UE during the predicted trajectory, and at least one secondary RS that will potentially be experienced by the UE during the predicted trajectory; receiving from the UE feedback based on the at least one primary RS and the at least one secondary RS; receiving from the UE an update of the velocity vector; and reperforming the predicting based at least on the received update.

Example 10. The method of example 9, wherein the velocity vector comprises information of at least one of speed, velocity, or directionality of movement.

Example 11. The method of example 9, wherein the at least one secondary RS is grouped into one or more sets of secondary RS.

Example 12. The method of example 9, wherein a timestamp indicates the time at which the UE will experience a particular primary or secondary RS.

Example 13. The method of example 12, further comprises receiving from the UE a reliability index associated with a RS timestamp.

Example 14. The method of example 9, further comprises sending to the UE information regarding a time at which a transition from a primary RS to another primary RS is expected.

Example 15. The method of example 9, wherein the feedback comprises at least one of the following: an indication indicating that no primary RS is detected; an indication indicating that a secondary RS is detected; an indication indicating that the UE is on track of the predicted trajectory; or a RS index pair between a previous RS index and a current RS index.

Example 16. The method of example 15, wherein receiving the update of the velocity vector is in response to the RS index pair being (primary_RS_index i, secondary_RS_index j).

Example 17. A computer program, comprising code for performing the methods of any of examples 1 to 16, when the computer program is run on a computer.

Example 18. The computer program according to example 17, wherein the computer program is a computer program product comprising a computer-readable medium bearing computer program code embodied therein for use with the computer.

Example 19. The computer program according to example 17, wherein the computer program is directly loadable into an internal memory of the computer.

Example 20. An apparatus, comprising means for performing: estimating a velocity vector that is experienced by a user equipment; reporting to a network element, NE, the velocity vector; receiving from the NE at least one primary reference signal, RS, which will be experienced during a predicted trajectory, and at least one secondary RS that will potentially be experienced during the predicted trajectory; sending to the NE feedback based on the at least one primary RS and the at least one secondary RS; and sending an update of the velocity vector to the NE.

Example 21. The apparatus of example 20, further comprising means for performing the method of any of examples 2 to 8.

Example 22. The apparatus of example 20, wherein the means comprising: at least one processor; and at least one memory including computer program code, the at least one memory and computer program code configured to, with the at least one processor, cause the performance of the apparatus.

Example 23. An apparatus, comprising means for performing: receiving from a user equipment, UE, a velocity vector that is experienced by the UE; predicting for the UE a trajectory, and a mapping of the beams/RSs, which the UE may experience along the trajectory; sending to the UE at least one primary reference signal, RS, which will be experienced by the UE during the predicted trajectory, and at least one secondary RS that will potentially be experienced by the UE during the predicted trajectory; receiving from the UE feedback based on the at least one primary RS and the at least one secondary RS; receiving from the UE an update of the velocity vector; and reperforming the predicting based at least on the received update.

Example 24. The apparatus of example 23, further comprising means for performing the method of any of examples 10 to 16.

Example 25. The apparatus of example 23, wherein the means comprising: at least one processor; and at least one memory including computer program code, the at least one memory and computer program code configured to, with the at least one processor, cause the performance of the apparatus.

Example 26. An apparatus, comprising: at least one processor; and at least one memory including computer program code, the at least one memory and computer program code configured to, with the at least one processor, cause the apparatus to estimate a velocity vector that is experienced by the apparatus; report to a network element, NE, the velocity vector; receive from the NE at least one primary reference signal, RS, which will be experienced during a predicted trajectory, and at least one secondary RS that will potentially be experienced during the predicted trajectory; send to the NE feedback based on the at least one primary RS and the at least one secondary RS; and send an update of the velocity vector to the NE.

Example 27. An apparatus, comprising: at least one processor; and at least one memory including computer program code, the at least one memory and computer program code configured to, with the at least one processor, cause the apparatus to receive from a user equipment, UE, a velocity vector that is experienced by the UE; predict for the UE a trajectory, and a mapping of the beams/RSs, which the UE may experience along the trajectory; send to the UE at least one primary reference signal, RS, which will be experienced by the UE during the predicted trajectory, and at least one secondary RS that will potentially be experienced by the UE during the predicted trajectory; receive from the UE feedback based on the at least one primary RS and the at least one secondary RS; receive from the UE an update of the velocity vector; and reperform the predicting based at least on the received update.

Example 28. A computer program product comprising a computer-readable storage medium bearing computer program code embodied therein for use with a computer, the computer program code comprising code for estimating a velocity vector that is experienced by a user equipment; code for reporting to a network element, NE, the velocity vector; code for receiving from the NE at least one primary reference signal, RS, which will be experienced during a predicted trajectory, and at least one secondary RS that will potentially be experienced during the predicted trajectory; code for sending to the NE feedback based on the at least one primary RS and the at least one secondary RS; and code for sending an update of the velocity vector to the NE.

Example 29. A computer program product comprising a computer-readable storage medium bearing computer program code embodied therein for use with a computer, the computer program code comprising code for receiving from a user equipment, UE, a velocity vector that is experienced by the UE; code for predicting for the UE a trajectory, and a mapping of the beams/RSs, which the UE may experience along the trajectory; code for sending to the UE at least one primary reference signal, RS, which will be experienced by the UE during the predicted trajectory, and at least one secondary RS that will potentially be experienced by the UE during the predicted trajectory; code for receiving from the UE feedback based on the at least one primary RS and the at least one secondary RS; code for receiving from the UE an update of the velocity vector; and code for reperforming the predicting based at least on the received update.

Embodiments of the present invention may be implemented in software, hardware, application logic or a combination of software, hardware and application logic. The software, application logic and/or hardware may reside on an apparatus such as a user equipment, a gNB or other mobile communication devices. If desired, part of the software, application logic and/or hardware may reside on a NE 901, part of the software, application logic and/or hardware may reside on a UE 911, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a non-transitory computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention.

Further, the various names used for the described parameters are not intended to be limiting in any respect, as these parameters may be identified by any suitable names. If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:

1. An apparatus, comprising:
at least one processor; and
at least one memory comprising computer program code, the at least one memory and computer program code configured, with the at least one processor, to cause the apparatus at least to:
estimate a velocity vector that is experienced by the apparatus;
report to a network element, NE, the velocity vector;
receive from the NE at least one primary reference signal, RS, which will be experienced during a predicted trajectory, and at least one secondary RS that will potentially be experienced during the predicted trajectory;
send to the NE feedback based on the at least one primary RS and the at least one secondary RS; and
send an update of the velocity vector to the NE.

2. The apparatus according to claim 1, wherein the velocity vector comprises information of at least one of speed, velocity, or directionality of movement.

3. The apparatus according to claim 1, wherein the at least one secondary RS is grouped into one or more sets of secondary RS.

4. The apparatus according to claim 1, wherein a timestamp indicates the time at which the UE will experience a particular primary or secondary RS.

5. The apparatus according to claim 4, wherein the at least one memory and computer program code configured, with the at least one processor, to cause the apparatus to send to the NE a reliability index associated with a RS timestamp.

6. The apparatus according to claim 1, wherein the at least one memory and computer program code configured, with the at least one processor, to cause the apparatus to receive information regarding a time at which a transition from a primary RS to another primary RS is expected.

7. The apparatus according to claim 1, wherein the feedback comprises at least one of the following:
an indication indicating that no primary RS is detected;
an indication indicating that a secondary RS is detected;
an indication indicating that the UE is on track of the predicted trajectory; or
a RS index pair between a previous RS index and a current RS index.

8. The apparatus according to claim 7, wherein sending the update of the velocity vector is in response to the RS index pair being (primary_RS_index i, secondary_RS_index j).

9. An apparatus, comprising:
at least one processor; and
at least one memory comprising computer program code, the at least one memory and computer program code configured, with the at least one processor, to cause the apparatus at least to:

receive from a user equipment, UE, a velocity vector that is experienced by the UE;
predict for the UE a trajectory, and a mapping of the beams/RSs, which the UE may experience along the trajectory;
send to the UE at least one primary reference signal, RS, which will be experienced by the UE during the predicted trajectory, and at least one secondary RS that will potentially be experienced by the UE during the predicted trajectory;
receive from the UE feedback based on the at least one primary RS and the at least one secondary RS;
receive from the UE an update of the velocity vector; and
reperform the predicting based at least on the received update.

10. The apparatus according to claim 9, wherein the velocity vector comprises information of at least one of speed, velocity, or directionality of movement.

11. The apparatus according to claim 9, wherein the at least one secondary RS is grouped into one or more sets of secondary RS.

12. The apparatus according to claim 9, wherein a timestamp indicates the time at which the UE will experience a particular primary or secondary RS.

13. The apparatus according to claim 12, wherein the at least one memory and computer program code configured, with the at least one processor, to cause the apparatus to receive from the UE a reliability index associated with a RS timestamp.

14. The apparatus according to claim 9, wherein the at least one memory and computer program code configured, with the at least one processor, to cause the apparatus to send to the UE information regarding a time at which a transition from a primary RS to another primary RS is expected.

15. The apparatus according to claim 9, wherein the feedback comprises at least one of the following:
an indication indicating that no primary RS is detected;
an indication indicating that a secondary RS is detected;
an indication indicating that the UE is on track of the predicted trajectory; or
a RS index pair between a previous RS index and a current RS index.

16. The apparatus according to claim 15, wherein receiving the update of the velocity vector is in response to the RS index pair being (primary_RS_index i, secondary_RS_index j).

17. A method, comprising:
estimating a velocity vector that is experienced by the apparatus;
reporting to a network element, NE, the velocity vector;
receiving from the NE at least one primary reference signal, RS, which will be experienced during a predicted trajectory, and at least one secondary RS that will potentially be experienced during the predicted trajectory;
sending to the NE feedback based on the at least one primary RS and the at least one secondary RS; and
sending an update of the velocity vector to the NE.

18. The method according to claim 17, further comprising:
sending to the NE a reliability index associated with a RS timestamp.

19. The method according to claim 17, further comprising:
receiving information regarding a time at which a transition from a primary RS to another primary RS is expected.

20. The method according to claim 17, wherein the feedback comprises at least one of the following:
an indication indicating that no primary RS is detected;
an indication indicating that a secondary RS is detected;
an indication indicating that the UE is on track of the predicted trajectory; or
a RS index pair between a previous RS index and a current RS index.

* * * * *